US008719139B1

(12) United States Patent
Smyk

(10) Patent No.: US 8,719,139 B1
(45) Date of Patent: May 6, 2014

(54) METHOD AND APPARATUS FOR EVALUATING THE IMPACT OF VENTURE CAPITAL INVESTMENT AGREEMENT PROVISIONS ON PAYOFFS TO INVESTORS AND ENTREPRENEURS

(76) Inventor: Darek Smyk, Basking Ridge, NJ (US)

( * ) Notice: Subject to any disclaimer, the term of this patent is extended or adjusted under 35 U.S.C. 154(b) by 965 days.

(21) Appl. No.: 12/577,180

(22) Filed: Oct. 10, 2009

(51) Int. Cl.
G06Q 40/00 (2012.01)
G06Q 40/04 (2012.01)
G06Q 40/06 (2012.01)

(52) U.S. Cl.
CPC ............... G06Q 40/04 (2013.01); *G06Q 40/06* (2013.01)
USPC ...................................................... 705/36 R

(58) Field of Classification Search
CPC ............................. G06Q 40/04; G06Q 40/06
USPC ........................................ 705/35, 36, 36 R
See application file for complete search history.

(56) References Cited

U.S. PATENT DOCUMENTS

| 7,548,880 B1* | 6/2009 | Mintz | 705/36 R |
| 7,933,825 B2* | 4/2011 | Mintz | 705/36 R |
| 8,046,295 B1* | 10/2011 | Cohan | 705/37 |
| 2001/0032157 A1* | 10/2001 | Dannenberg et al. | 705/36 |
| 2002/0032599 A1* | 3/2002 | Chandler et al. | 705/10 |
| 2002/0156709 A1* | 10/2002 | Andrus et al. | 705/35 |
| 2003/0028467 A1* | 2/2003 | Sanborn | 705/36 |
| 2003/0101115 A1* | 5/2003 | Reddy | 705/35 |
| 2003/0144941 A1* | 7/2003 | Lister | 705/36 |
| 2004/0153388 A1* | 8/2004 | Fisher et al. | 705/36 |
| 2004/0177021 A1* | 9/2004 | Carlson et al. | 705/36 |
| 2005/0273404 A1* | 12/2005 | Ostergard | 705/35 |
| 2006/0212375 A1* | 9/2006 | Funez et al. | 705/35 |
| 2007/0132181 A1* | 6/2007 | Daniels | 273/256 |
| 2008/0147767 A1* | 6/2008 | Le Grand | 708/490 |
| 2008/0228663 A1* | 9/2008 | Smith | 705/36 R |
| 2009/0216669 A1* | 8/2009 | Lambe | 705/30 |

OTHER PUBLICATIONS

BVCA investing in enterprise; "A Guide to Venture Capital Term Sheets"; Jo Taylor; May 2004; pp. 1-54.*

* cited by examiner

*Primary Examiner* — Ella Colbert

(57) ABSTRACT

A method and apparatus for evaluating an impact of enterprise investment agreement provisions on payoffs to equity holders, including investors and entrepreneurs. An investment agreement evaluator comprises a data collector, analyzer and report generator. One embodiment evaluates the impact of Venture Capital term sheet provisions. The data collector gathers information which includes term sheet provisions, enterprise forecasts and market forecasts. The analyzer determines the probability distribution for future payoffs to equity holders and estimates the current market value of equity held by equity holders. The report generator presents the evaluator results. Another embodiment analyzes definitive VC investment agreements. Other embodiments are described and shown through the use of the evaluator, entrepreneurs increasing their effectiveness in negotiating VC deals, VC attorneys expanding value-added services and increasing customer satisfaction. Venture Capitalists using the elevator increase returns for their investment portfolio.

20 Claims, 15 Drawing Sheets

METHOD AND APPARATUS FOR EVALUATING THE IMPACT OF VENTURE CAPITAL INVESTMENT AGREEMENT PROVISIONS ON PAYOFFS TO INVESTORS AND ENTREPRENEURS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO COMPUTER PROGRAM LISTING APPENDIX

A computer program listing appendix containing the sources code of a computer program that may be used with the present invention is incorporated herein by reference and appended hereto as one (1) original compact disc, and an identical copy thereof, containing a total of twenty-four (24) files as follows:

| Filename | Date of Creation | Time of Creation | Size (bytes) |
| --- | --- | --- | --- |
| Chart3_cls.txt | Oct. 4, 2009 | 6:12 PM | 219 |
| Chart4_cls.txt | Oct. 4, 2009 | 6:12 PM | 219 |
| Chart5_cls.txt | Oct. 4, 2009 | 6:13 PM | 219 |
| Chart6_cls.txt | Oct. 4, 2009 | 6:13 PM | 219 |
| Chart7_cls.txt | Oct. 4, 2009 | 6:13 PM | 219 |
| Chart8_cls.txt | Oct. 4, 2009 | 6:13 PM | 219 |
| Chart9_cls.txt | Oct. 4, 2009 | 6:13 PM | 219 |
| clsApp_cls.txt | Oct. 4, 2009 | 6:13 PM | 511 |
| Config_form_frm.txt | Oct. 4, 2009 | 6:14 PM | 2,010 |
| Module1_bas.txt | Oct. 4, 2009 | 6:15 PM | 41,000 |
| Sheet1_cls.txt | Oct. 4, 2009 | 6:15 PM | 294 |
| Sheet2_cls.txt | Oct. 4, 2009 | 6:15 PM | 219 |
| Sheet3_cls.txt | Oct. 4, 2009 | 6:15 PM | 219 |
| Sheet4_cls.txt | Oct. 4, 2009 | 6:15 PM | 219 |
| Sheet5_cls.txt | Oct. 4, 2009 | 6:15 PM | 219 |
| Sheet6_cls.txt | Oct. 4, 2009 | 6:15 PM | 219 |
| Sheet7_cls.txt | Oct. 4, 2009 | 6:16 PM | 219 |
| Sheet8_cls.txt | Oct. 4, 2009 | 6:16 PM | 219 |
| ThisWorkbook_cls.txt | Oct. 4, 2009 | 6:16 PM | 282 |
| UserForm_TermSheet_frm.txt | Oct. 4, 2009 | 6:16 PM | 682 |
| UserForm_Wizard_frm.txt | Oct. 4, 2009 | 6:16 PM | 22,700 |

BACKGROUND OF THE INVENTION

1. Field

This application relates to financial data processing, specifically to a method and apparatus for evaluating how various provisions included in the venture capital term sheet and definitive investment agreements will impact current and future returns to the enterprise shareholders including venture capital investors and the enterprise founders.

2. Prior Art

Venture Capital companies provide money to young, rapidly growing companies with promising new products or services in exchange for ownership in the company. Major market sectors for VC investments include software; life sciences, telecommunications, clean technologies, and media and entertainment. The US Venture Capital industry includes about 900 VC companies with over $250 billion of investments under management. According to the MoneyTree Report by PricewaterhouseCoopers, in 2008 venture capitalists invested $28.3 billion in 3,008 deals. The UK venture capital market accounts for 40% of the whole European VC market and is second in size to the United States. British Venture Capital Association, BVCA, has around 165 full member firms, which represent the vast majority of UK-based private equity and venture capital firms.

The venture capital investment process is now a well-established method of raising funds for early stage companies. Institutional venture capital comes from professionally managed funds that typically have $25 million to $1 billion to invest in emerging growth companies. Since investing in early stage companies entails significant risk, the venture capital is relatively expensive, i.e. in exchange for funds the venture capital investors demand significant equity in the business. The earlier the investment stage, the more equity is required to convince a venture capital to invest. Funds typically available for investment in a single company range from $500,000 to $10 million. The average venture capital investment is about $8 million.

The term sheet is a preliminary agreement used to anchor the key contractual provisions for a Venture Capital investment. When a VC company is interested in investing in an enterprise it typically expresses its intentions by offering a term sheet to the target enterprise The provisions of the term sheet largely cover the value of the enterprise and how much ownership the founders and other shareholders give up in order to get the VC investment. The enterprise evaluates the provisions of the term sheet and either agrees to them, rejects them or proceeds to negotiating changes to some of the provisions. When all parties agree to the provisions of the term sheet, the agreement is signed. As the next step the VC performs due diligence, followed by negotiating the definitive investment agreement, provisions of which are largely anchored by the provisions of the term sheet. Lawyers use the term sheet for drafting the investment documents.

To reach a beneficial agreement the party to the term sheet must fully understand the term sheet provisions and appreciate their financial implications. However, the term sheet provisions are very complex. Since they are written in a legal language many provisions are difficult to understand by a layman. In addition, some provisions imply the use of complex formulas which describe how such terms as liquidation preference or anti-dilution mechanism will impact future payoffs to the investors and other company shareholders, including the company founders. The matter becomes even more complicated if one tries to estimate the impact of the combination of over 20 provisions which comprise a typical term sheet. Finally, the task becomes daunting when given the specific set of term sheet provisions and the estimates of future enterprise valuations one tries to estimate probabilities of future payoffs to shareholders or evaluate the current market value of the shareholders' shares in the enterprise. Thus, to fully understand the term sheet provisions and their financial implications, the person must possess both legal and financial expertise.

While entrepreneurs, such as company founders, are full of admirable qualities, they often do not have the required legal and financial acumen to appreciate the implications of complex provisions of the term sheet. As a result they are at a disadvantage while negotiating the term sheet agreement and other investment documents based on the term sheet. In addition to lacking skills, they also lack experience in evaluating the term sheet provisions. Even a successful serial entrepreneur typically makes a term sheet-based deal no more than once every 2-5 years, while a VC is likely to make similar deals over 10 times a year, and a VC attorney 20-50 times a year.

VC attorneys representing entrepreneurs are very capable of discerning the legal language of the term sheet documents. However, they are often not sufficiently equipped to provide quantitative financial analysis of the impact of the term sheet's provisions on the investors' returns. Thus, to level the playing field and reduce the asymmetry in the ability to evaluate the provisions of the term sheet, there is a need for easy to use system which will enable all parties evaluate how various provisions included in the venture capital term sheet agreement will impact current and future returns to the enterprise shareholders including venture capital investors and the enterprise founders.

While the VC investors are typically in the best position to perform quantitative evaluation of the provisions implications they would definitely benefit from easy-to-use tools which will facilitate fast and comprehensive analysis which would allow VCs make better deals through quantitative fine-tuning of term sheet provisions. With ever changing business conditions, the prospects of VC portfolio companies are also changing. VC need portfolio management tools which taking into considerations changing market-wide and company specific forecasts determine the current market value of VC's investments governed by existing definitive investment agreements.

Previously, the parties to the term sheet agreement were provided by a sample term sheet and a written description of the provisions of the agreement. For example, a sample term sheet was produced by a coalition of attorneys who specialize in venture capital financings, working under the auspices of the National Venture Capital Association (NVCA). It is available on the NVCA web site at www.nvca.org. The general meaning of the provisions of the term sheet is explained in "A Guide to Venture Capital Term Sheets" published by British Venture Capital Association, as well as, in documents published on the NVCA web site. In addition, there are available books which explain the meaning of each term of the Venture Capital term sheet, e.g. "Term Sheets & Valuations—A Line by Line Look at the Intricacies of Venture Capital Term Sheets & Valuations "(Bigwig Briefs) by Alex Wilmerding, and "Deal Terms—The Finer Points of Venture Capital Deal Structures, Valuations, Term Sheets, Stock Options and Getting VC Deals Done" (Inside the Minds) by Alex Wilmerding. These materials also explain how a change of an individual provision, all other things being equal, will impact the future payoff to the parties of the agreement. Specifically, they explain, how to calculate a payoff to each shareholder/investor, based on specific predicted value of the enterprise at the time of the company liquidation.

Previously, there were available printed materials which explain how to use Black-Sholes call option valuation equations to value the investors share in the enterprise, based on individual provision of the VC term sheet. The option valuation methodology is used to estimate the present market value of the investor's holding.

However, the published materials don't explain how to simultaneously take into consideration comprehensive set of term sheet provisions and determine how the firm's liquidation value will be distributed to shareholders/investors under these provisions. Moreover, they don't explain how to take into consideration multiple term sheet provisions and, based on the estimated distribution of the enterprise valuation at the time of exit, estimate the statistical distribution (probabilities) of the payoffs to each party of the agreement. Also, the published materials don't explain how to take into consideration comprehensive set of term sheet provisions and, based on the estimated probability distribution of the enterprise valuation at the time of exit, estimate the current market value of each shareholder's/investor's share in the enterprise.

The published material does not describe the methods of implementing the VC term sheet evaluation apparatus, which provides easy to use comprehensive evaluation of how various provisions included in the venture capital term sheet agreement will impact current and future returns to the enterprise shareholders including venture capital investors and the enterprise founders.

In summary, previously the parties to the term sheet agreement lacked comprehensive, easy-to-use methods and apparatus which would enable them to evaluate the financial implications of the provisions of the term sheet. This situation put at a disadvantage most entrepreneurs who lack the experience and training of the venture capital investors and attorneys. It also made VC firms investment decisions less efficient.

SUMMARY

In accordance with one embodiment an investment agreement evaluator for evaluating impact of enterprise investment agreement provisions on equity holders payoffs comprises a data collector, an analyzer and a report generator whereby the evaluator reports describe estimated payoffs to equity holders under provisions specified in the investment agreement, and user can evaluate the impact of provisions on investment returns to equity holders, including investors and entrepreneurs.

BRIEF DESCRIPTION OF THE DRAWINGS

Figures

The accompanying drawings, which are incorporated in and constitute a part of the specification, illustrate presently preferred implementations of the invention and, together with the general description given above and the detailed description of the preferred implementations given below, serve to explain the principles of the invention.

In the drawings:

FIG. 1 is a block diagram of an investment agreement evaluator in accordance with one embodiment of the present invention;

FIG. 2 illustrates a pictorial representation of a computer system, which may be utilized to implement the first embodiment of the present invention;

FIG. 3 depicts a representative hardware environment of a computer system in which the first embodiment of the present invention can be implemented;

FIG. 4 illustrates a diagram of a client/server architecture in accordance with the second embodiment of the present invention;

FIG. 5 illustrates an exemplary welcome screen provided by the input collector of the investment agreement evaluator in accordance with one embodiment of the present invention;

FIG. 6 illustrates an exemplary capitalization screen provided by the input collector of the investment agreement evaluator in accordance with one embodiment of the present invention;

FIG. 7 illustrates an exemplary dividends screen provided by the input collector of the investment agreement evaluator in accordance with one embodiment of the present invention;

FIG. 8 illustrates an exemplary liquidation screen provided by the input collector of the investment agreement evaluator in accordance with one embodiment of the present invention;

FIG. 9 illustrates an exemplary valuation assumptions screen provided by the input collector of the investment agreement evaluator in accordance with one embodiment of the present invention;

FIG. 10 illustrates an exemplary absolute exit payoffs screen provided by the report generator of the investment agreement evaluator in accordance with one embodiment of the present invention;

FIG. 11 illustrates an exemplary percentage exit payoffs screen provided by the report generator of the investment agreement evaluator in accordance with one embodiment of the present invention;

Figure 12:
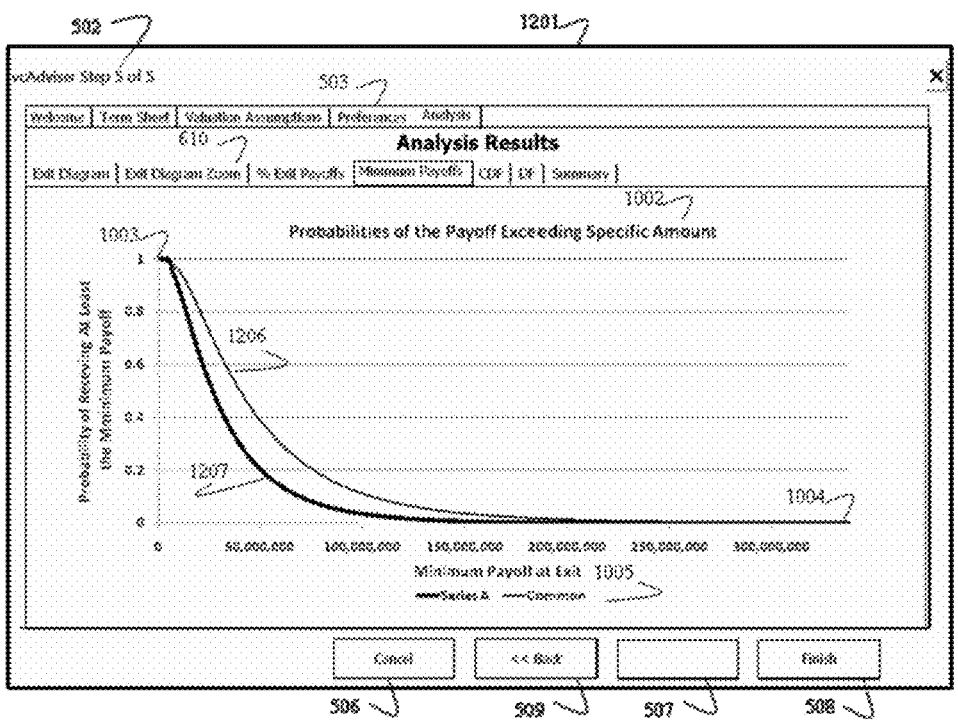
Figure 13:
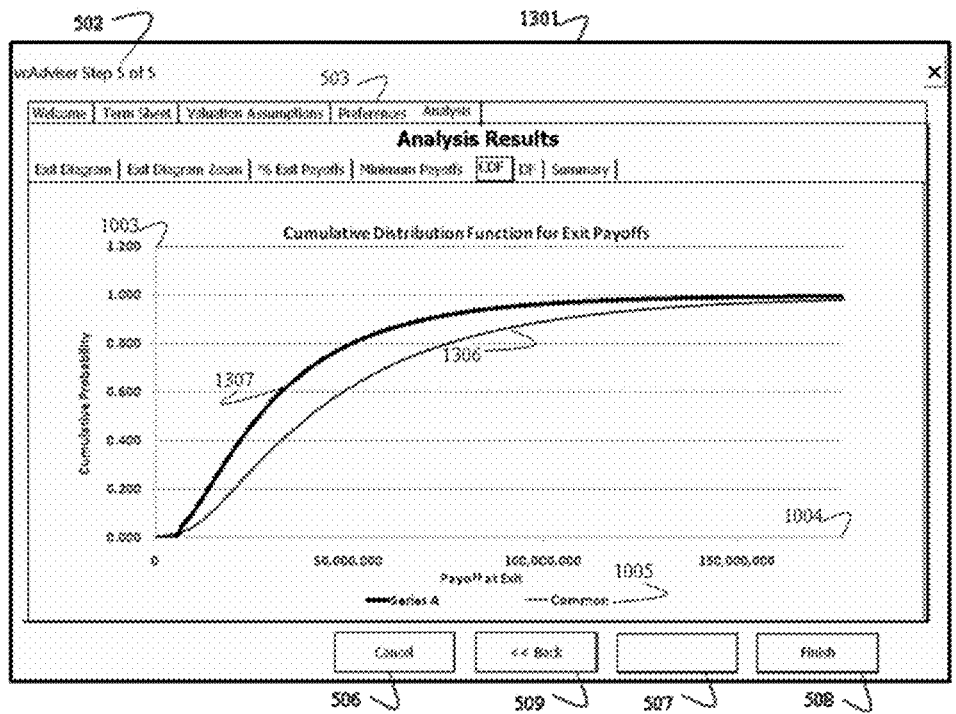
Figure 14:
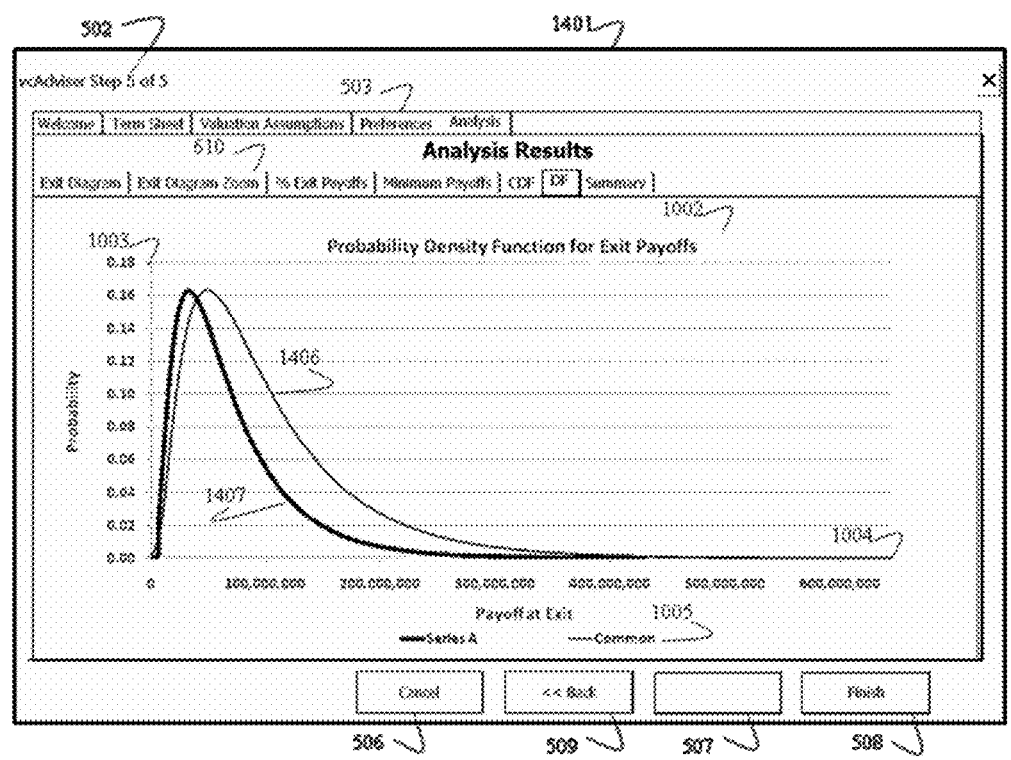
Figure 15:
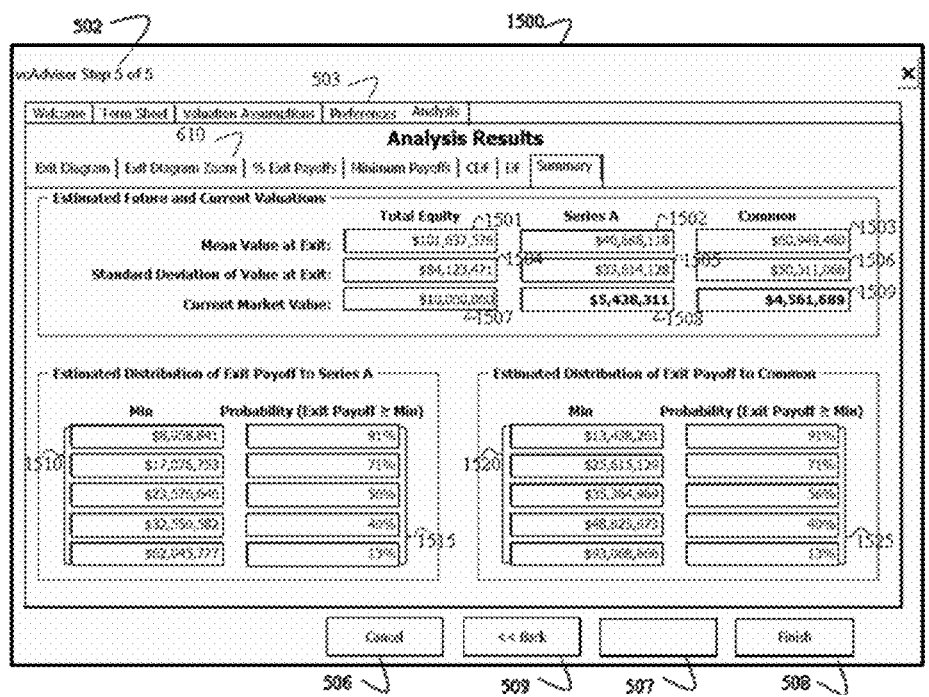

FIG. 12 illustrates an exemplary minimum exit payoff screen provided by the report generator of the investment agreement evaluator in accordance with one embodiment of the present invention;

FIG. 13 illustrates an exemplary exit payoff cumulative distribution screen provided by the report generator of the investment agreement evaluator in accordance with one embodiment of the present invention;

FIG. 14 illustrates an exemplary exit payoff probability density screen provided by the report generator of the investment agreement evaluator in accordance with one embodiment of the present invention;

FIG. 15 illustrates an exemplary enterprise investment evaluation summary screen provided by the report generator of the investment agreement evaluator in accordance with one embodiment of the present invention;

DETAILED DESCRIPTION

Figure 1:
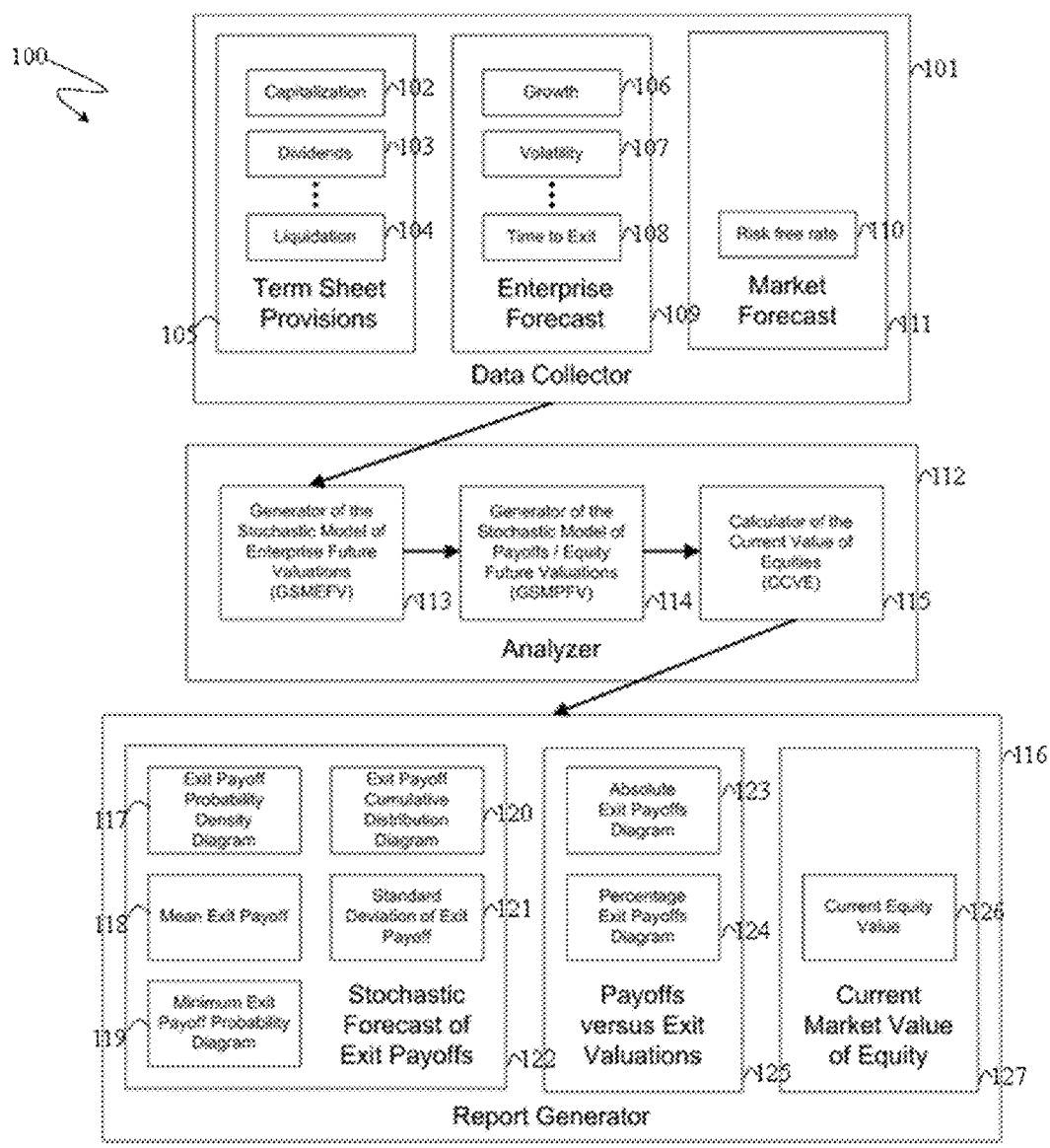

FIG. 1 is a block diagram of investment agreement evaluator 100 in accordance with one embodiment of the present invention. As shown investment agreement evaluator 100 includes data collector 101, analyzer 112 and report generator 116.

In the first embodiment of the present invention the investment agreement evaluated by investment agreement evaluator 100 is a venture capital term sheet.

Data collector 101 preferably collects information which includes term sheet provisions 105, enterprise forecast 109 and market forecast 111. Term sheet provisions 105 collected by data collector 101 include a plurality of clauses included in the term sheet, including but not limited to, clauses regarding enterprise capitalization 102, dividends 103 and liquidation 104. Enterprise forecast 109 collected by data collector 101 includes forecasted rate of growth 106, growth volatility 107 and investor's projected time to exit 108. Market forecast 111 collected by data collector 101 includes forecasted risk free rate 110 during the planning period spanning from the present time to time to exit 108.

Analyzer 112 preferably includes a Generator of the Stochastic Model of Enterprise Future Valuations ("GSMEFV") 113, Generator of the Stochastic Model of Payoffs/equity Future Valuations ("GSMPFV") 114 and Calculator of the Current Value of Equities ("CCVE") 115.

Report generator 116 preferably generates diagrams and reports on stochastic forecast of exit payoff 122, payoffs versus exit valuations 125 and current market value of equity 127. Stochastic forecast of exit payoff 122 may include the following diagrams: exit payoff probability density diagram 117, minimum exit payoff probability diagram 119 and exit payoff cumulative distribution diagram 120. Additionally, stochastic forecast of exit payoff 122 may include reports on mean exit payoff 118 and standard deviation of exit payoff 121. Payoffs versus exit valuations 125 may include absolute exit payoff diagram 123 and percentage exit payoff diagram 124. Current market value of equity 127 may include current equity value 126 for each enterprise equity holder.

Figure 2:
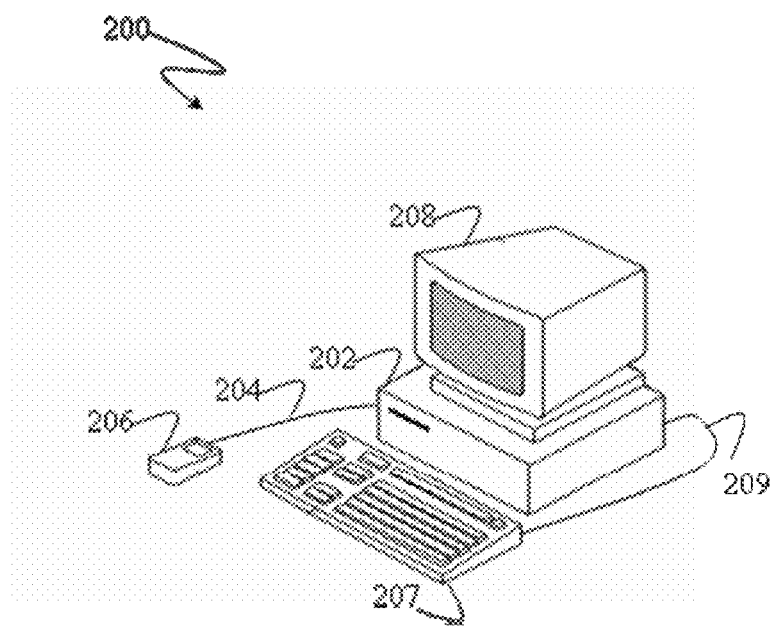

FIG. 2 illustrates a pictorial representation of a computer system 200, which may be utilized to implement a preferred embodiment of the present invention. Computer system 200 includes a system unit 202, a video display terminal 208, a mouse 206, a keyboard 207, a mouse cable 204, and a keyboard cable 209. Mouse cable 204 connects said mouse to said system unit. Keyboard cable 209 connects said keyboard to said system unit. Those skilled in the art can appreciate that the method and system of the present invention apply equally to any computer system, regardless of whether the computer system is generally implemented as a complicated multi-user computing apparatus or a single-user workstation.

Figure 3:
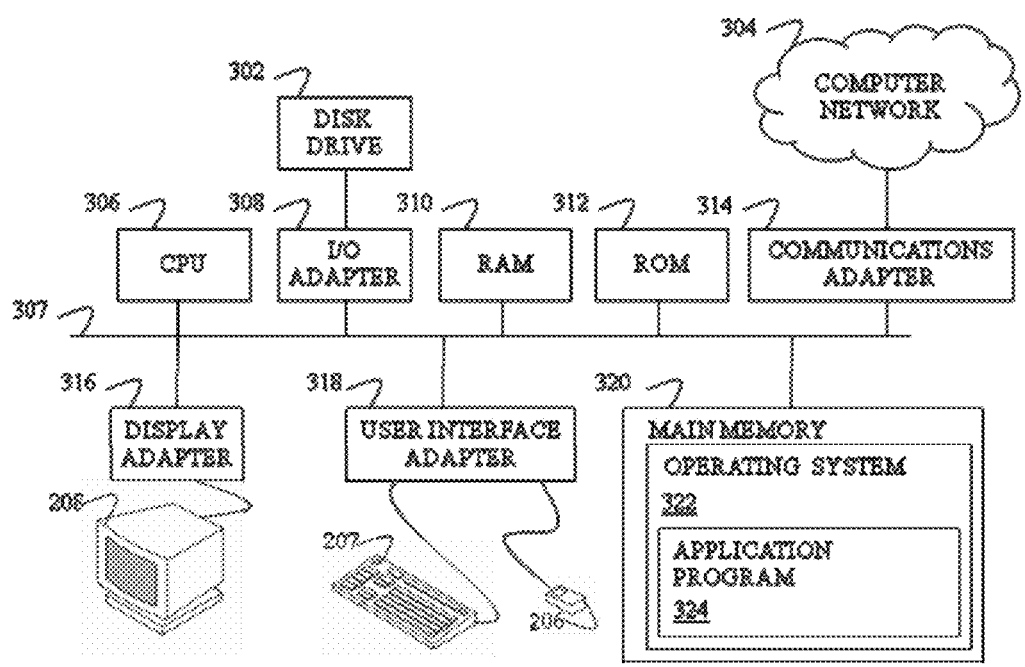

FIG. 3 depicts a representative hardware environment of the computer system of a preferred embodiment of the present invention. Computer system 200 includes a Central Processing Unit ("CPU") 306, such as a conventional microprocessor, and a number of other units interconnected via system bus 307. Such components and units of computer system 200 can be implemented in a system unit such as system unit 202 of FIG. 2. Computer system 200 further includes random-access memory ("RAM") 310, read-only memory ("ROM") 312, display adapter 316 for connecting system bus 307 to video display terminal 208, and I/O adapter 308 for connecting peripheral devices, e.g. disk drive 302, to system bus 307.

Communication adapter 314 connects computer system 200 to a network, such as computer network 304. Computer system 200 further includes user interface adapter 318 for connecting keyboard 206, mouse 208 and/or other user interface devices to system bus 307. Video display terminal 208 generally provides the visual output of computer system 200. Although computer system 200 is shown to contain only a single CPU and a single system bus, it should be understood that the present invention applies equally to computer systems that have multiple CPUs and to computer systems that have multiple buses that each perform different functions in different ways.

Those skilled in the art can appreciate that the hardware depicted in FIG. 2 may vary for specific applications. For example, other peripheral devices such as video adapters, printers, scanners, may be utilized in addition to or in place of the hardware already depicted.

Computer system 200 also includes an interface that resides within a machine readable media to direct the operation of computer system 200. Any suitable machine-readable media may retain the interface, such as ROM 312, RAM 310 or an optical or magnetic disk located in a disk drive 302. Any suitable operating system and associated interface (e.g. LINUX, Microsoft Windows) may direct CPU 306. Main Memory 320 may be connected to system bus 307, and includes operating system 322 and application program 324. Application program 324 contains instructions that, when executed on CPU 306, carry out the operations of the described herein investment agreement evaluator 100. Such an application program may be implemented as, or may include, signal-bearing media such as recordable media and/or transmission media.

It is important to note that, while the present invention has been (and will continue to be) described in the context of fully functional computer system, those skilled in the art can appreciate that the present invention may be capable of being distributed as an application program in a variety of forms, and that the present invention applies equally regardless of the particular type of signal-bearing media utilized to actually carry out the distribution. Examples of signal-bearing media include transmission-type media such as analog and digital communications links; and recordable-type media, such as CD-ROMs, USB sticks and hard disk drives.

Figure 5:
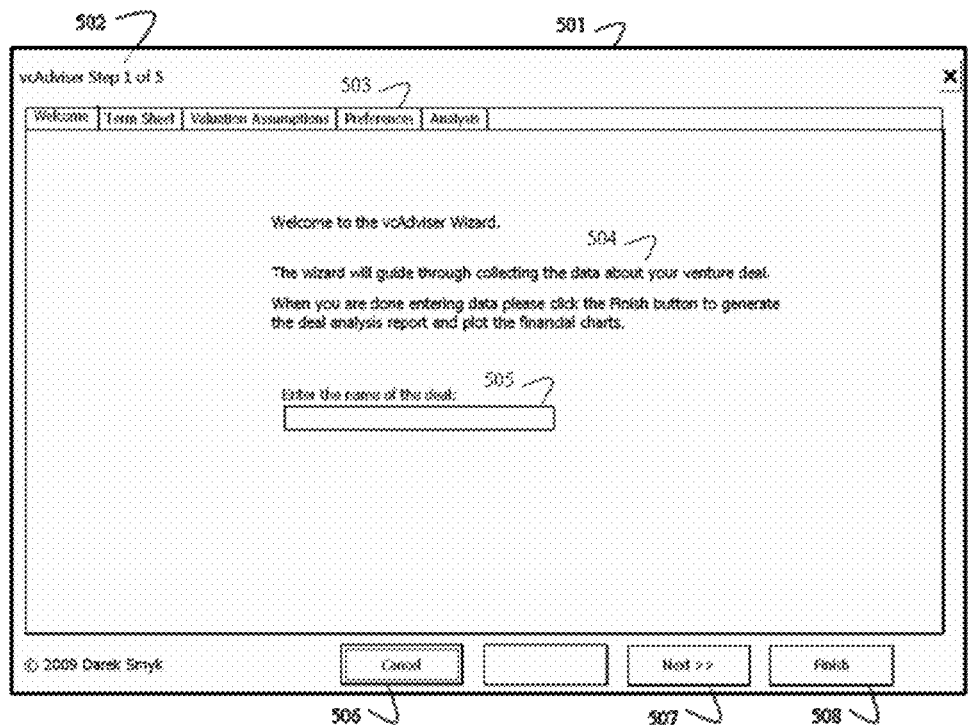

FIG. 5 depicts welcome screen 501, in accordance with a preferred embodiment of the present invention. In the preferred embodiment of the present invention the user interactions with investment agreement evaluator 100 will be guided by a user-friendly wizard interface. Wizard step number 502 informs the user which wizard step is being executed and thus helps the user judge the progress of the investment agreement evaluator processing. Wizard tabs 503 enable the user to go directly to a specific section of the wizard by clicking the tab corresponding to the wizard section. Instruction 504 informs the user how to use the enterprise investment evaluator. User provides information into the program by entering data into the fields displayed on the screen. Project name field 505 permits a user to enter the name of the investment evaluation project. By clicking buttons displayed on the screen a user may request the program to perform specific functions. Cancel button 506 permits the user to abandon the execution of the enterprise investment evaluator. Next button 507 permits the user to request the program to proceed to the next step of the wizard. Finish button 508 permits the user to request the program to save the current state of the program and stop the execution.

Figure 6:
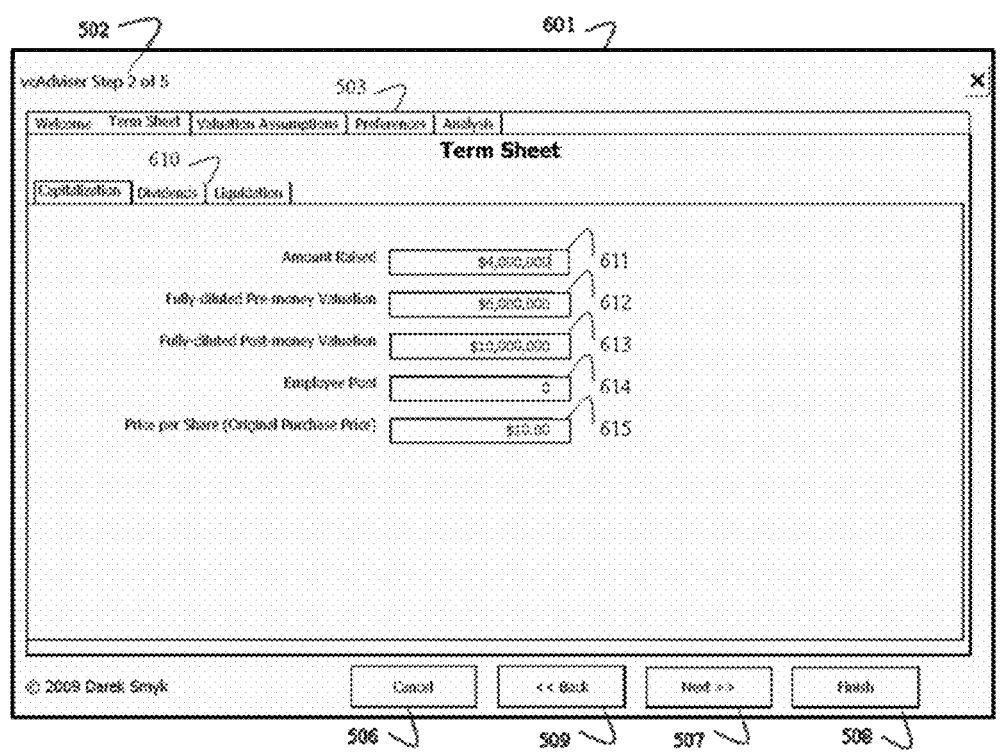

FIG. 6 depicts capitalization screen 601, in accordance with a preferred embodiment of the present invention. Capitalization screen 601 illustrates implementation of data collector 101 functions which encompass collecting information about the term sheet provisions related to capitalization 102. Amount raised field 611 permits a user to enter the amount raised from the Series A equity investor. Pre-money valuation field 612 permits a user to enter the fully diluted pre-money valuation. Post-money valuation field 613 permits a user to enter the fully diluted post-money valuation. Employee pool field 614 permits a user to enter the value of equity allocated to employees. Price per share field 615 permits a user to enter price per share, otherwise known as original purchase price. Term sheet tabs 610 permit a user to navigate between term provisioning screens including capitalization screen 601, dividends screen 701 and liquidation screen 801.

Figure 7:
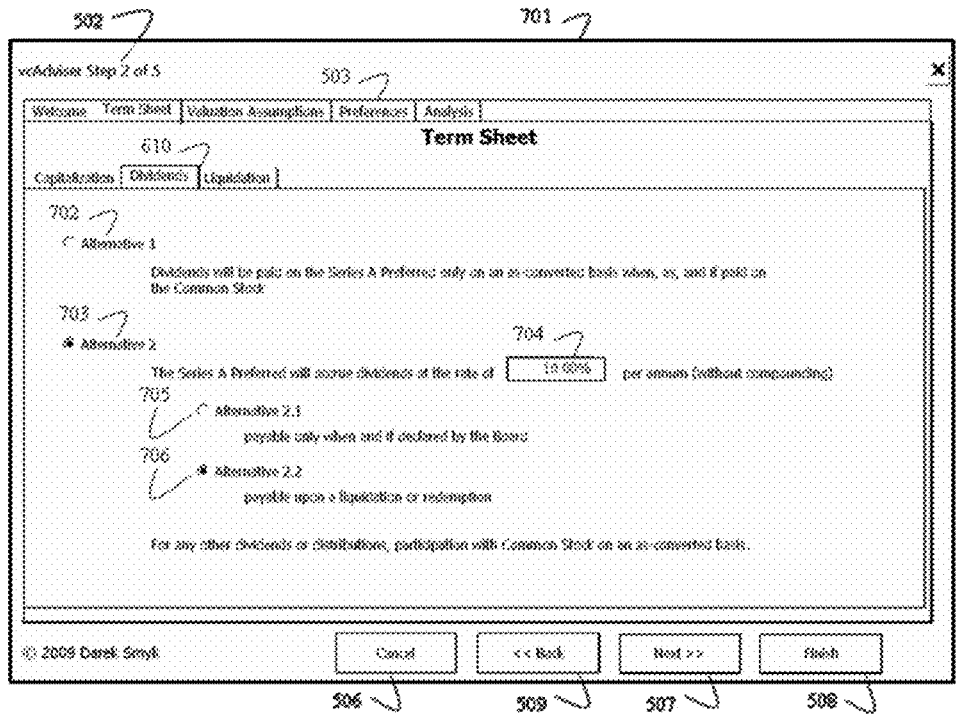

FIG. 7 depicts dividends screen 701, in accordance with a preferred embodiment of the present invention. Dividends screen 701 illustrates implementation of data collector 101 functions which encompass collecting information about the term sheet provisions related to dividends 103. Dividends alternative 1 radio button 702 and dividends alternative 2 radio button 703 permit the user to choose the dividend payment alternative corresponding to the dividends payment provision in the term sheet. Dividend accrual rate field 704 permits a user to enter the annual accrual rate for dividends for Series A preferred equity holders. Dividends payability alternative 1 radio button 705 and dividends payability alternative 2 radio button 706 permit the user to specify under what conditions the dividends will become payable to Series A equity holders. The selection between of Dividends payability alternative 1 radio button 705 or dividends payability alternative 2 radio button 706 is only valid if dividends alternative 2 radio button 703 is selected.

Figure 8:
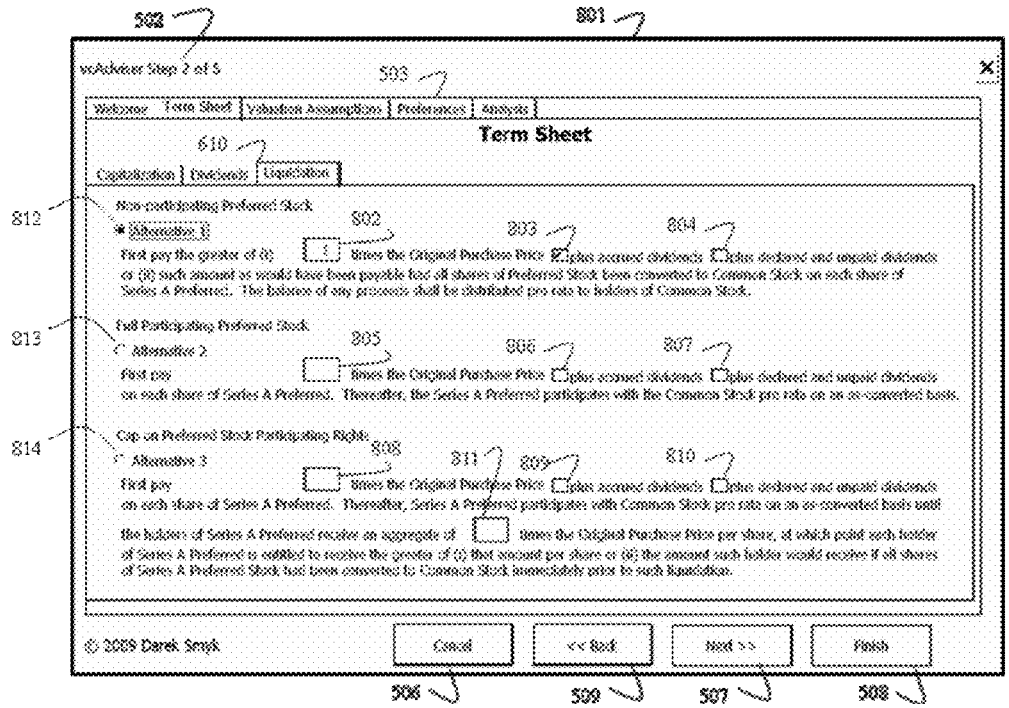

FIG. 8 depicts liquidation screen 801, in accordance with a preferred embodiment of the present invention. Liquidation screen 801 illustrates implementation of data collector 101 functions which encompass collecting information about the term sheet provisions related to liquidation 104. Liquidation alternative 1 radio button 812, liquidation alternative 2 radio button 813 and liquidation alternative 3 radio button 814 permit the user to choose alternatives corresponding to the liquidation preference provision in the term sheet. Liquidation alternative 1 radio button 812 permits the user to select alternative 1 corresponding to exit preferences associated with non-participating preferred stock. Liquidation alternative 1 multiplier 802, liquidation alternative 1 accrued dividends checkmark 803 and liquidation alternative 1 declared dividends checkmark 804 enable the user to further specify specific provisions related to liquidation alternative 1. Liquidation alternative 2 radio button 813 permits the user to select alternative 2 corresponding to exit preferences associated with full participating preferred stock. Liquidation alternative 2 multiplier 805, liquidation alternative 2 accrued dividends checkmark 806 and liquidation alternative 2 declared dividends checkmark 807 enable the user to further specify specific provisions related to liquidation alternative 2. Liquidation alternative 3 radio button 814 permits the user to select alternative 3 corresponding to exit preferences associated with cap on preferred stock participation rights. Liquidation alternative 3 multiplier 808, liquidation alternative 3 accrued dividends checkmark 809, liquidation alternative 3 declared dividends checkmark 810 and liquidation alternative 3 cap 811 enable the user to further specify specific provisions related to liquidation alternative 3.

Figure 9:
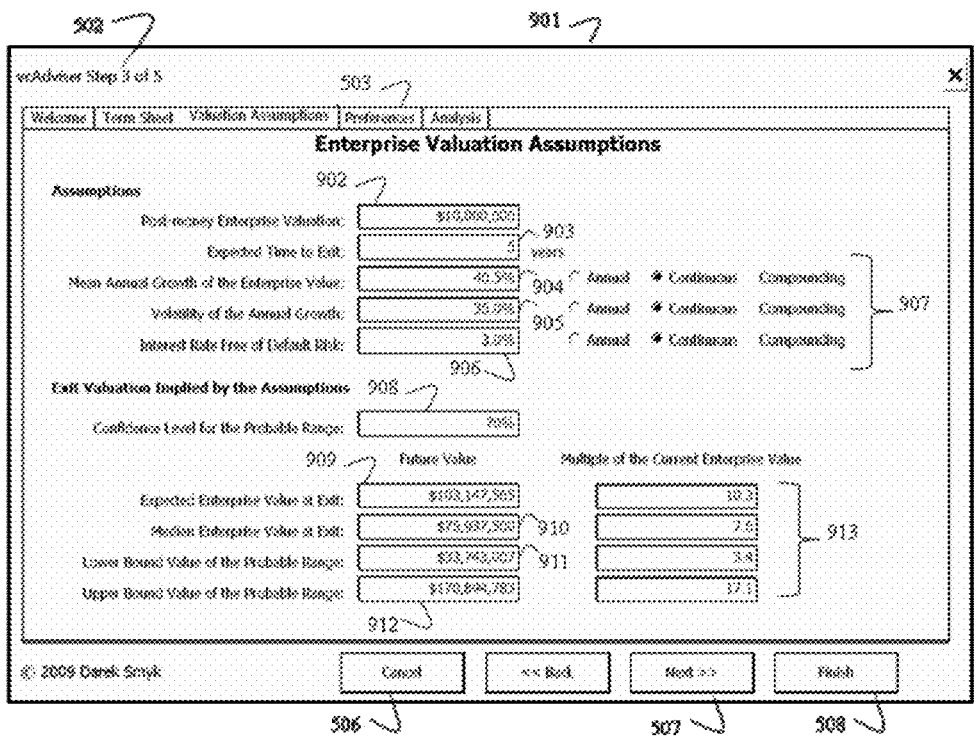

FIG. 9 depicts valuation assumptions screen 901, in accordance with a preferred embodiment of the present invention. Valuation assumptions screen 901 illustrates implementation of data collector 101 functions which encompass collecting information related to enterprise forecast 109. Post-money valuation assumption field 902 displays information previously entered by the user in post-money valuation field 613. Expected time to exit field 903 permits the user to enter the estimated period time until the investment will be harvested. Mean annual growth field 904 permits the user to enter estimated enterprise mean annual growth rate for the investment planning period. Annual growth volatility field 905 permits the user to enter the estimated standard deviation of enterprise annual growth rate for the investment planning period. Default risk free rate field 906 permits the user to enter estimated default risk free rate for the planning period. Compounding radio buttons 907 enable the user to specify whether the numbers entered in mean annual growth field 904, annual growth volatility field 905 and default risk free rate field 906 assume annual or continuous compounding. Confidence level field 908 permits the user to enter the confidence level which is used to determine the lower bound and upper bound value of the probable range for enterprise value at exit. Expected enterprise value 909 and median enterprise value 910 display the harvest time mean and median enterprise value implied by the data entered in post-money valuation field 613, expected time to exit field 903, mean annual growth field 904, annual growth volatility field 905, default risk free rate field 906, compounding radio buttons 907. Lower bound value 911 and upper bound value 912 display the lower bound and upper limit value of the probable range for enterprise value at exit. Current value multiples 913 display the ratios of the value displayed in expected enterprise value 909, median enterprise value 910, lower bound value 911, upper bound value 912 and the value displayed post-money enterprise valuation 103.

Figure 10:
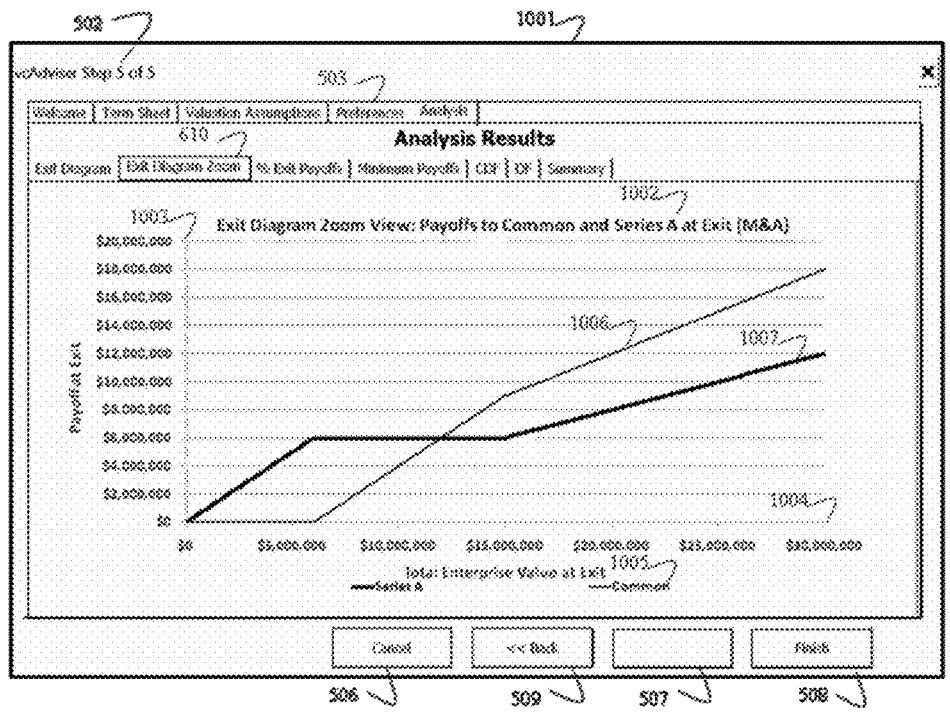

FIG. 10 depicts absolute exit payoffs screen 1001, in accordance with a preferred embodiment of the present invention. Absolute exit payoffs screen 1001 illustrates implementation of report generator 116 functions which encompass generating absolute exit payoff diagram 123. Diagram title 1002 displays the title of the diagram which depicted on the screen. Y-axis 1003 and x-axis 1004 display the x and y coordinates for the diagram graphs. Legend 1005 provides information which identifies graphs corresponding to common and Series A equity investments. Exit payoffs to common 1006 is the graph representing how the payoff to common equity holders will vary depending on the total enterprise value at exit. Exit payoffs to Series A 1007 is the graph representing how the payoff to Series A equity holders will vary depending on the total enterprise value at exit.

Figure 11:
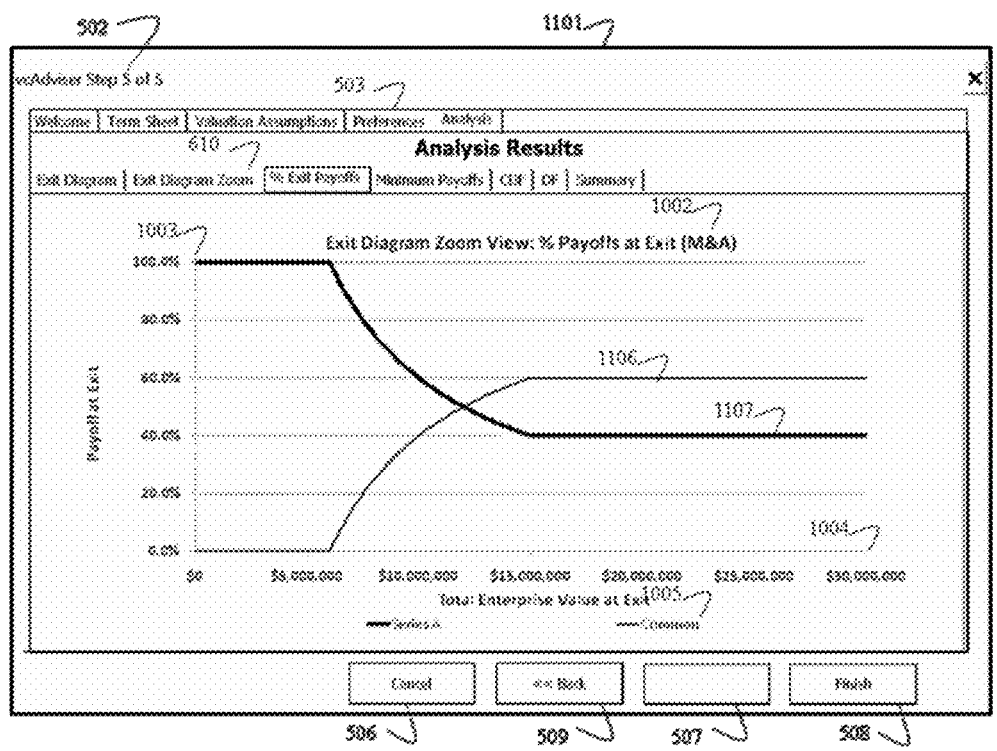

FIG. 11 depicts percentage exit payoffs screen 1101, in accordance with a preferred embodiment of the present invention. Percentage exit payoffs screen 1101 illustrates implementation of report generator 116 functions which encompass generating percentage exit payoff diagram 124. Percentage exit payoffs to common 1106 is the graph representing how the payoff, represented the percentage of the total payoff, to common equity holders will vary depending on the total enterprise value at exit. Percentage exit payoffs to Series A 1107 is the graph representing how the payoff, represented the percentage of the total payoff, to Series A equity holders will vary depending on the total enterprise value at exit.

FIG. 12 depicts minimum exit payoff screen 1201, in accordance with a preferred embodiment of the present invention. Minimum exit payoff screen illustrates implementation of report generator 116 functions which encompass generating minimum exit payoff probability diagram 119. Minimum exit payoff to common 1206 is the graph representing probabilities (represented on y-axis) that the payoff to common equity holder will exceed specific amounts (represented on x-axis). Minimum exit payoff to Series A 1207 is the graph representing probabilities that the payoff to Series A equity holder will exceed specific amounts.

FIG. 13 depicts exit payoff cumulative distribution screen 1301, in accordance with a preferred embodiment of the present invention. Exit payoff cumulative distribution screen 1301 illustrates implementation of report generator 116 functions which encompass generating exit payoff cumulative distribution diagram 120. Cumulative distribution for exit payoffs to common 1306 is the graph representing cumulative distribution function for exit payoffs to common equity holders. Cumulative distribution for exit payoffs to Series A 1307 is the graph representing cumulative distribution function for exit payoffs to Series A equity holders.

FIG. 14 depicts exit payoff probability density screen 1401, in accordance with a preferred embodiment of the present invention. Exit payoff probability density screen 1401 illustrates implementation of report generator 116 functions which encompass generating exit payoff probability density diagram 117. Probability density function for exit payoff to common 1406 is the graph representing probability distribution function for exit payoffs to common equity holders. Probability density function for exit payoff to Series A 1407 is the graph representing probability distribution function for exit payoffs to Series A equity holders.

FIG. 15 depicts term sheet analysis summary screen 1500, in accordance with a preferred embodiment of the present invention. Term sheet analysis summary screen 1500 illustrates implementation of report generator 116 functions which encompass generating reports on mean exit payoff 118, standard deviation of exit payoff 121 and current equity value 126. Mean value of total equity at exit 1501 displays the expected value of total equity at the time of investment harvest. Mean value of Series A equity at exit 1502 displays the expected value of Series A equity at the time of investment harvest. Mean value of common equity at exit 1503 displays the expected value of common equity at the time of investment harvest. Standard deviation of total equity at exit 1504 displays the standard deviation of the value of total equity at the time of investment harvest. Standard deviation of Series A equity at exit 1505 displays the standard deviation of the value of Series A equity at the time of investment harvest. Standard deviation of common equity at exit 1506 displays the standard deviation of the value of common equity at the time of investment harvest. Current market value of total equity 1507 displays the post-money valuation entered by the user in post-money valuation field 613. Current market value of Series A equity 1508 displays the present market value of Series A equity determined by the previously specified term sheet provisions, as well as, the enterprise and market forecasts. Current market value of common equity 1509 displays the present market value of common equity determined by the previously specified term sheet provisions, as well as, the enterprise and market forecasts. The data displayed on term sheet analysis summary screen 1500 includes information on probabilities that the exit payoffs to Series A and Common equity investors will exceed specified minimum threshold amounts. Series A threshold fields 1510 display threshold amounts for minimum payoffs at exit to Series A equity holders. Series A threshold probability fields 1515 display probabilities that the exit payoff to Series A is greater than or equal to the amounts specified in corresponding Series A threshold fields 1510. Common threshold fields 1520 display threshold amounts for minimum payoffs at exit to common equity holders. Common threshold probability fields 1525 display probabilities that the exit payoff to common is greater than or equal to the amounts specified in corresponding common threshold fields 1520.

Operation

First Embodiment

FIGS

FIG. 1 depicts a block diagram of an investment agreement evaluator 100. FIG. 1 depicts components of investment agreement evaluator 100 and describes the flow of investment agreement evaluator 100 operations. The terms sheet evaluation process is initiated by executing functions of the data collector 101. In the preferred embodiment data collector 101 collects information from the user through a sequence of computer screens. The data collector 101 screens are presented by the program wizard which guides the user through data input and per user request provides help information. The data collector 101 starts the gathering process by displaying welcome screen 501. Welcome screen 501 provides user with the introduction to the data collection process and prompts the user for the name of the enterprise investment evaluation project. At any time during the use of investment agreement evaluator 100 the user can click cancel button 506 to abandon the execution of the program. After the user enters the required data and clicks next button 507, data collector 101 displays a series of screens related to term sheet provisions, including capitalization screen 601, dividend screen 701 and liquidation screen 801.

Capitalization screen 601 collects from user information about the term sheet provisions related to the capitalization of the enterprise, including the amount of money raised from the investor, pre-money and post-money valuations, the amount of money allocated to the employee pool, as well as, the original purchase price. Dividends screen 701 collects from user information about the term sheet provisions related to the dividend rights, accrual methods, dividend rate, and payability conditions. Liquidation screen 801 gathers information related to liquidation preferences granted to preferred equity holders, including but not limited the following liquidation rights: non-participating preferred stock, full participating preferred stock, capped preferred stock participating rights. The data collector 101 allows a user to enter the term sheet information at any order. By clicking on term sheet tabs 601, a user can navigate between term provisioning screens including capitalization screen 601, dividends screen 701 and liquidation screen 801. It can be appreciated by one skilled in the art that data collector 101 allows the user to enter additional term sheet provisions, such as anti-dilution provisions.

After the user enters the required term sheet provisioning data and clicks next button 507, data collector 101 displays valuation assumptions screen 901. By clicking back button 509 the user can navigate back to the welcome screen.

Valuation assumptions screen 901 collects from user information about the term sheet provisions related the forecast of the future total enterprise value. Valuation assumptions screen 901 a user enters the estimated investor's exit time, otherwise known as investment harvest time. For planning purposes it is typically assumed that the investors will reap profits from their investments when the enterprise goes public in the Initial Public Offering (IPO exit) or the enterprise is acquired by a strategic investor (Mergers and Acquisition, M&A, exit). Thus, the estimated exit time is typically equal to forecasted time of either IPO or M&A exit event. Additionally, using valuation assumptions screen 901, a user enters forecasted average default risk free rate for the duration of the planning period in default risk free rate field 905. Typically, investors assume that the default risk free rate is equal to the interest rate offered by the U.S. Treasury on its obligations.

Finally, using valuation assumptions screen 901, a user enters forecast of the future total enterprise valuation. In one embodiment of the invention, the forecast of the future total enterprise valuation is expressed by the mean annual growth of the enterprise value and the volatility of the annual growth of the enterprise value, entered respectively in mean annual growth field 904 and annual growth volatility field 905. The volatility is expressed as the standard deviation of the annual growth. In order to provide ease of use the data collector permits a user to enter rates assuming either annual or continuous compounding. Current post-money total enterprise valuation combined with forecasted mean and volatility of annual growth rate indirectly express the probabilistic distribution of the forecasted future valuation of the total enterprise. In order to help a user understand the implications of the forecasted mean and volatility of the growth rate, data collector 101 calculates and displays the following future valuations: expected enterprise value 909 and median enterprise value 910 at exit time. In addition to help realize a stochastic nature of the future valuations the data collector displays lower bound value 911 and upper bound value 912 of the probable range for enterprise value at exit. Data collector 101 permits the user to select confidence level for the probable range by entering the desired value in confidence level field 908. To assist the user in understanding the magnitude of the forecasted future valuations data collector 101 displays current value multiples 913 which the ratios of the value displayed in expected enterprise value 909, median enterprise value 910, lower bound value 911, upper bound value 912 and the value displayed post-money enterprise valuation 103.

As depicted on FIG. 1, in the preferred embodiment investment agreement evaluator 100 executes functions of analyzer 112 to process the inputs collected by data collector 101. In the preferred embodiment the functions of analyzer 112 are carried out by the following functional components: generator of the model of enterprise future valuations ("GSMEFV") 113, generator of the model of payoffs/equity future valuations ("GSMPFV") 114 and calculator of the current value of equities "CCVE" 115.

GSMEFV 113 generates a model of how the total enterprise value will change over time. In one embodiment of the present invention it assumed that there is stability in the uncertainty and no serial correlation in the continuously compounded growth rate of the total enterprise value during the planning time period. has a normal distribution.

GSMEFV 113 generates a model of how the total enterprise value will change over time. In one embodiment of the present invention it assumed that continuously compounded growth rate of the total enterprise value during the planning period has a normal distribution. Based this assumption GSMEFV 113 creates a binomial model to represent the changes in the total enterprise value. The binomial model is a model where the price of an asset, such as the total enterprise value, is monitored over successive periods of time. In each short period it is assumed that only two price movements are possible. In one embodiment of the present invention, the binomial model is programmatically represented as binary tree that represents how an asset price can evolve under the binomial model. The root node for the binary tree represents the total enterprise valuation, equal to "post-money" valuation, at the current time (time t=0). The leave nodes of the binary tree represent enterprise total valuations at the end of the planning period, i.e. investment harvest time. The binary tree is generated based on user input collected by data collector 101, including user data entered in post-money valuation field 613, expected time to exit field 903, mean annual growth field 904, annual growth volatility field 905, compounding radio buttons 907 and default risk free rate field 906.

For each node of the total enterprise value binary tree, GSMEFV 113 calculates corresponding objective probability, which represents the probability that the total valuation of the enterprise will be equal to enterprise value assigned to the node. In addition, for each leaf of the total enterprise value binary tree, GSMEFV 113 calculates corresponding cumulative objective probability, which represents probability that at the time of exit the total enterprise value will be less than or equal to the value assigned to the leaf.

GSMPFV 114 generates a model of future payoffs to investors and entrepreneurs. In one embodiment of the present invention, GSMPFV 114 utilizes a binary tree based implementation of the binomial model. For each leave node of the total enterprise value binary tree, which was generated by GSMEFV 113, GSMPVF 114 calculates corresponding payoffs to investors and entrepreneurs.

CCVE 115 determines the current value of equities assigned to investors and entrepreneurs by the term sheet agreement. CCVE 115 implementation is based on the observation that the current value of the investors' and entrepreneurs shares in the enterprise is derived from the predicted future valuations of the total enterprise. In essence, for each specific future value of the total enterprise the term sheet provisions in their entirety specify how to calculate payoffs to investors and entrepreneurs. While the calculations of the term sheet-based payoffs can be quite complicated they are analogous to calculating payoffs to stock option holders. For example, the payoff for American Call option for 200 shares of ABC corporation, with exercise price of $100 and expiration date of Jun. 13, 2010, is equal to max{0, S-$100} prior to option expiration and 0 afterwards, where S is the price of the underlying stocks. Similarly for each future value of the total enterprise at any moment in time, one can calculate the corresponding payoffs to investors and shareholders by taking into consideration all the applicable provisions of the term sheet. The finance industry designed many methods of valuing stock derivatives. The present invention applies these methods to determine the current market value of equities assigned to investors and entrepreneurs by the term sheet agreement. In the preferred embodiment of the present invention the total value of the enterprise is treated as the asset underlying the derivatives and the term sheet provisions describe the derivation formula determining the value of investors' and shareholders, equity based on the value of the underlying asset. CCVE 115 applies derivatives valuation methods to calculate the current value of investors' and shareholders' equity. CCVE 115, In one embodiment of the present invention, CCVE 115, utilizes binomial models to determine the current market value of investors' and shareholders' equity. In another embodiment of the present invention, CCVE 115, applies Monte Carlo simulation to determine the current market value investors' and shareholders' equity. It can be appreciated by one skilled in the art that based on the above described specification of the underlying asset and derivation formula the calculation of the current market value investors' and shareholders' equity may be implemented by a variety of derivatives valuation methods.

As depicted on FIG. 1, investment agreement evaluator 100 executes functions of report generator 116 to display the results of the analysis performed by analyzer 112. The task of report generator 116 is to present the analysis results in a manner which is informative and easy to-interpret by a user. In the preferred embodiment report generator 116 presents the analysis through a set of computer screens.

Absolute exit payoffs screen 1001 and percentage exit payoffs screen 1101 provide user with graphical diagrams which illustrates how the future investors and founders' payoffs will vary depending on the realized valuation of the total enterprise at the time of exit. In one embodiment of the present invention, report generator 116 generates absolute exit payoffs screen 1001 and percentage exit payoffs screen 1101 based on the data which was stored by GSMEFV 113 and GSMPFV 114 in the leaves of the binary tree, such data including total enterprise valuations and the corresponding payoffs to investors and entrepreneurs. Absolute exit payoffs screen 1001 expresses the payoffs as absolute dollar amounts, while percentage exit payoffs screen 1101 express the payoffs as percentage of the total payoffs at exit. Term sheet provisions are often designed to heavily skew returns towards investors especially for lower valuations of the enterprise. Such skewness is introduced to shift the risk of failure towards founders and away from the investors. The absolute and percentage exit diagrams will clearly present the extent to which the term sheet provisions skew future returns and go a long way towards leveling the playing field.

Minimum exit payoff screen 1201 provides investors and founders with information on probabilities of realizing returns which exceed specified values. For example, an investor putting into the enterprise an investment of $3M will be able to find out the probability of at least doubling or tripling his investment. In one embodiment of the present invention, report generator 116 generates minimum exit payoff screen 1201 based on the data which was stored by GSMEFV 113 and GSMPFV 114 in the leaves of the binary tree, such data including payoffs to investors and entrepreneurs and the corresponding cumulative objective probabilities.

While exit diagrams help to convey how big the level of payoff will be for the given total valuation of the enterprise they don't provide any information on how likely this level of payoff is. Minimum exit payoff screen helps to close the information gap by providing probabilities. Such information is invaluable to both investors and founders. It helps in evaluating the impact of term sheet provisions on expected payoffs. It also helps in comparing the attractiveness of the investment in the enterprise and other investment opportunities. Exit payoff cumulative distribution screen 1301 and exit payoff probability density screen 1401 also present the payoff probability distribution information. In one embodiment of the present invention, report generator 116 generates exit payoff cumulative distribution screen 1301 and exit payoff probability density screen 1401 based on the data which was stored by GSMEFV 113 and GSMPFV 114 in the leaves of the binary tree, such data including payoffs to investors and entrepreneurs and the corresponding objective probabilities.

Depending on personal preferences and the knowledge of statistics some users may prefer to use exit payoff cumulative distribution screen 1301, exit payoff probability density screen 1401 or Minimum exit payoff screen 1201 to assess the probability distribution of future returns.

Term sheet analysis summary screen 1500 presents to users a compendium of the results generated by investment agreement evaluator 100. It presents mean (expected) value of investors and founders' equity at the time of exit. Given the random nature of future valuation term sheet analysis summary screen 1500 also presents a standard deviation of the value of investors' and founders' equity at the time of exit. In one embodiment of the present invention, report generator 116 calculates mean and standard deviation of equity values at exit based on the data which was stored by GSMEFV 113 and GSMPFV 114 in the leaves of the binary tree, such data including payoffs to investors and entrepreneurs and the corresponding objective probabilities.

Term sheet analysis summary screen 1500 also includes information on probabilities that the exit payoffs to Series A and Common equity investors will exceed specified minimum threshold amounts. In one embodiment of the present invention, report generator 116 calculates minimum payoffs probabilities based on the data which was stored by GSMEFV and GSMPFV 114 in the leaves of the binary tree, such data including payoffs to investors and entrepreneurs and the corresponding cumulative objective probabilities.

Both the standard deviation and minimum threshold probability information helps the investors and founders in assessing how the term sheet provisions impact the volatility of future returns.

Term sheet analysis summary screen 1500 also presents the current market value of Series A equity 1505 and current market value of common equity 1506. In one embodiment of the present invention, report generator 116 presents the current market value of investors' and entrepreneurs' equity calculated by CCVE 115 by applying derivatives valuation methods, such as the binomial options pricing model or Monte Carlo simulation.

The estimates of the current market value of investors and founders' share of the enterprise are calculated by taking into considerations the term sheet provisions, the forecasted valuations of the enterprise and market participant current appetite for risk. It is invaluable information for all parties involved the term sheet negotiations. While the meaning and importance of the current market valuation can be easily grasped by financially unsophisticated VC attorneys and founders, such valuations have not been available in prior art.

The above specification of the first embodiment describes how investment agreement evaluator 100 evaluates the impact of the term sheet provisions on payoffs to equity holders, including entrepreneurs and the first round, Series A, investors. It can be appreciated by one skilled in the art that based on the above described specification the investment agreement evaluator 100 can also evaluate the investment agreements applicable to subsequent investment rounds, e.g. Series C investment rounds. For example, in the case of Series C term sheet, the data collector 101 collects information regarding the current (Series C) round term sheet, as well as, the investment agreement provisions applicable to equity held by pre-existing investors (Series A and Series B) who participated in investment rounds preceding the current investment round, including type of investor shares, dividend rights, liquidation preference, conversion rights, anti-dilution provisions and the current preferred stock conversion price. The analyzer 112 takes into consideration the rights of pre-existing investors, when determining the payoffs to investors and entrepreneurs. The report generator 116 presents the analysis results pertaining to each type of equity holders, including all Series of preferred stock.

In the first embodiment all the functions of investment agreement evaluator 100 are executed by a single computer 200.

Description

Second Embodiment

FIG. 4

Figure 4:
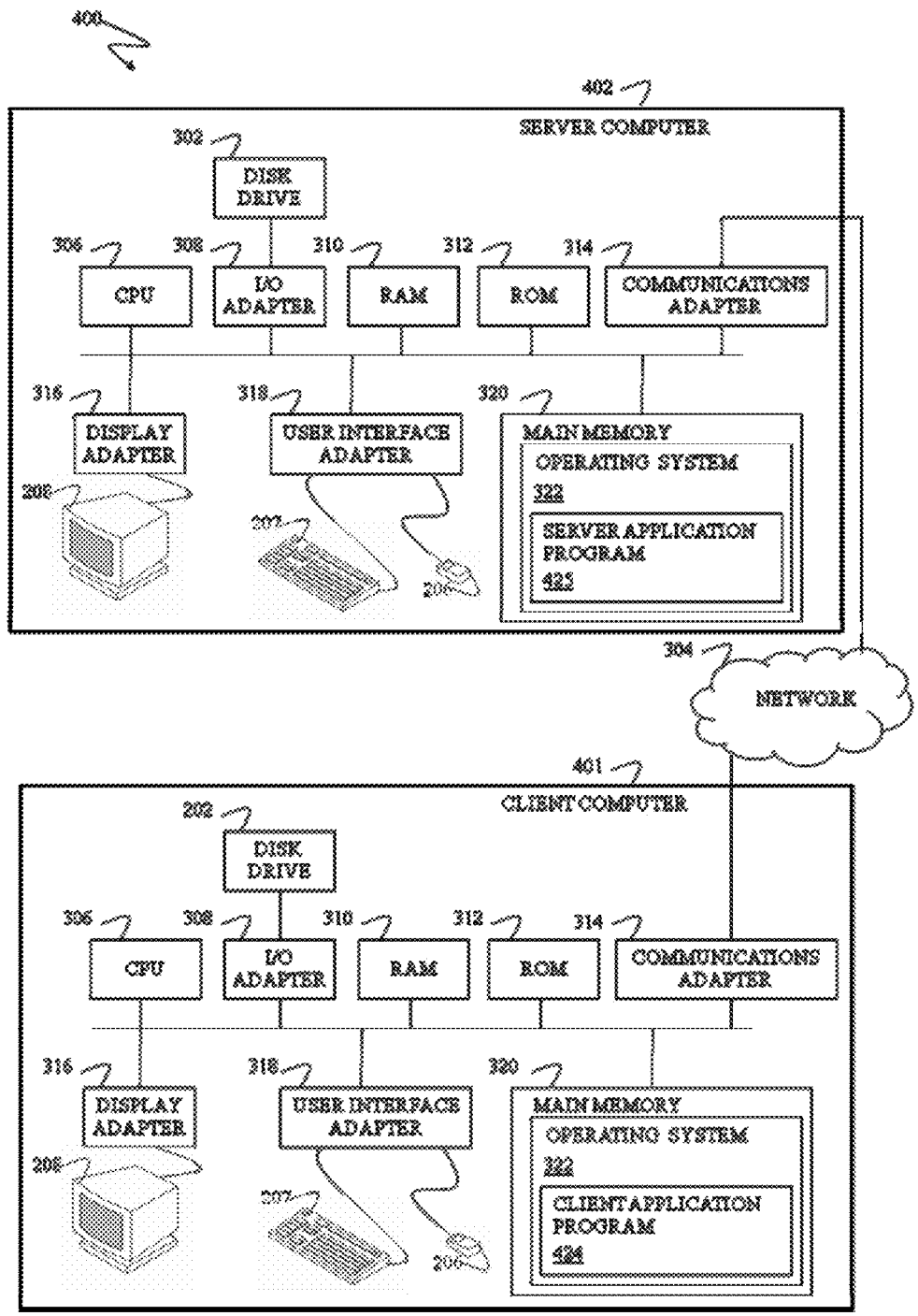

FIG. 4 depicts a representative hardware environment of the client/server architecture 400 in accordance with the second embodiment of the present invention. Although the client and server are processes that are operative within two computer systems, these processes being generated from a high-level programming language (e.g. Java), which can be interpreted and executed in a computer system at runtime (e.g. a PC or server blade) it can be appreciated by one skilled in the art that client and server processes may be implemented in a variety of hardware devices, either programmed or dedicated.

Client computer 401 and server computer 402 communicate utilizing computer network 304. Computer network 304 may be implemented as a private network or a public network, such as the Internet. Those skilled in the art can appreciate that client computer 401 and server computer 402 may utilize one or more communication protocols (e.g. HTTP and/or web services). In the client/server architecture the functionality equivalent to the functionality of application program 324 is distributed between client computer 401 and server computer 402. Client application program 424 executes on client computer 401 while server application program 425 executes on server computer 402. In the second embodiment of the invention client application program 424 and server application program 425 cooperate to jointly implement the functionality of investment agreement evaluator 100.

In the second embodiment the functions of investment agreement evaluator 100 are distributed between client computer 401 and server computer 402. In one embodiment of the client/server based implementation, the client computer 401 performs user interactions involved in carrying out functions of data collector 101 and report generator 116, while all the remaining functions are performed by the server computer 402. The client/server architecture based embodiment can be implemented via either thin client or thick client variation. The thin client variation of the client/server-based implementation can be based on an Internet browser, such as Microsoft Internet Explorer or Mozilla Firefox. The thin client displays data collector 101 screen, including welcome screen 501, capitalization screen 601, dividends screen 701, liquidation screen 801, valuation assumptions screen 901, and reports to the server computer 402 data entered by the user in said screens. Additionally, the thin client receives from the server computer 402 the results generated by investment agreement evaluator 100 and displays them in the following screens: absolute exit payoffs screen 1001, percentage exit payoffs screen 1101, minimum exit payoff screen 1201, exit payoff cumulative distribution screen 1301, exit payoff probability density screen 1401, term sheet analysis summary screen 1500. The thick client variation of the client/server-based implementation can be carried out as a Java applet or Enterprise Java Beans software. By comparison to the thin client, the thick client performs additional function on the client computer 401, such as extensive validation of the data entered by the user and presentation customization functions for the screens presenting the results generated by investment agreement evaluator 100. Those skilled in the art can appreciate that the method and system of the present invention apply equally to any client/server architecture, regardless of whether the client is generally implemented as a limited functionality thin client or feature rich thick client.

Description

Third Embodiment

FIG. 4

In the third embodiment of the present invention the investment agreement evaluated by investment agreement evaluator 100 is a venture capital definitive investment agreement. The term sheet outlines in general terms the investment agreement between the parties and with the exception of several clauses is non-binding. The definitive investment agreement is binding and it is signed after the investment deal outlined by the term sheet is successfully negotiated and finalized. A VC company manages investments in a portfolio of companies, each investment governed by a separate definitive investment agreement. The VC must monitor their portfolio to identify companies in view of changing business environment. As portfolio company-specific and market-wide forecasts change the VC must continuously identify companies which deserve nurturing or pruning.

In the first embodiment the evaluator is used as a tool helping parties to the term sheet agreement understand and negotiate the provisions of the VC term sheet. In the third embodiment the evaluator is used as a tool helping VCs determine how in the view of existing definitive investment agreements, changing business conditions impact expected VC investment returns.

In the third embodiment of the current invention investment agreement evaluator 100 is periodically executed for each company in the venture capital portfolio. Based on the provisions of definitive investment agreement, current enterprise and market forecasts the evaluator performs analysis and generates reports reflecting up-to-date estimates of future payoffs and the current market value of VC's share of equity in the company. Such information obtained timely for every company in which VC has invested is crucial to effectively performing VC portfolio management. It may also become a very valuable addition to the portfolio performance reports which VC partner periodically provides to its limited partners.

CONCLUSION, RAMIFICATION AND SCOPE

Accordingly the reader will see that at least one embodiment of the investment agreement evaluator provides an effective term sheet provisions evaluation tool which benefits entrepreneurs, VC attorneys and venture capitalists.

Through the use of the evaluator, entrepreneurs gain thorough understanding of how term sheet provisions impact future payoffs. Using the evaluator, entrepreneurs can perform quantitative comparison of term sheet variants which are under negotiations with the VC. In situations then the entrepreneurs are fortunate enough to receive term sheet proposals from multiple VCs, entrepreneurs can perform quantitative comparison of term sheets offered by competing VCs. Thus, the evaluator has the effect of leveling the playing field and increases entrepreneurs' effectiveness in negotiating VC deals.

Through the use of the evaluator, VC attorneys gain competitive advantage by increasing customer satisfaction and expanding value-added services. The evaluator helps VC attorneys deepen their understanding of financial implications of legal provisions in the term sheet. The heightened understanding enables VC attorneys to provide a better service to their customers.

Through the use of the evaluator, VCs are likely to increase their investment returns. VCs also stand to make better deals through quantitative fine-tuning of term sheet provisions. They also gain increased efficiency by cost effectively obtaining the analysis of term sheet provisions.

In addition, the third embodiment of the investment agreement evaluator provides an effective definitive investment agreement evaluation tool which provides extra benefits to VCs. Using the evaluator, VC can improve portfolio management by effectively monitoring ever changing expected returns of portfolio companies and identifying companies deserving nurturing or pruning. Finally, the VC can improve their periodical reporting to limited partners by including the current market valuation and future payoff reports generated by the evaluator.

While the above description contains many specificities, these should not be construed as limitations on the scope of any embodiment, but as exemplifications of the presently preferred embodiments thereof. Many other ramifications and variations are possible within the teachings of various embodiments. For example, in one embodiment, valuation assumptions screen 901 permits a user to enter the forecast of the future total enterprise valuation by entering the mean annual growth of the enterprise value and the volatility of the annual growth of the enterprise value. In an alternative embodiment, the forecast of the future total enterprise valuation can be entered by a user a set of future valuation amounts, including a mean total valuation at exit, as well as, lower bound value and upper bound for total valuation at exit for a given user-specified confidence level.

In one embodiment, data collector 101 gathers input data by interacting with human user of investment agreement evaluator 100. In an alternative embodiment, data collector 101 retrieves the input by processing electronic data which was produced by other computer programs. For example, the forecast of the future total enterprise valuation, including the mean and volatility of the enterprise annual growth, can be generated and stored in the electronic form by an enterprise valuation program. The output of the enterprise valuation program can be processed by data collector 101. In another alternative embodiment, data collector 101 retrieves the input by processing investment agreements. For example, data collector can scan paper-based investment agreements, perform character recognition, parse the text of the agreement and retrieve information on provisions of the agreement, including capitalization 102, dividends 103 and liquidation 104.

In one embodiment, report generator 116 generates reports and presents them on computer display to the user of investment agreement evaluator 100. In an alternative embodiment, report generator 116 generates reports and represents them in an electronic form so they can be processes by other computer programs. For example, the reports generated for a definitive VC investment agreement pertaining to VC's investment in VC portfolio company, may be represented in an electronic form so the reports can be processed a VC portfolio management program.

In one embodiment, the investment agreement evaluator 100 performs the analysis based on complete specification of enterprise forecast 109 and market forecast 111. The data collector 101 gathers input data on enterprise forecast 109 including growth 106, volatility 107 and time to exit 108. In addition, the data collector 101 gathers input data on market forecast 111 including risk free rate 110. In an alternative embodiment investment agreement evaluator 100 performs a sensitivity analysis which determine sensitivity of payoffs and current equity market value to enterprise and market forecasts. The data collector 101 collects only partial information about the enterprise and market forecast and the analyzer 112 performs the analysis for range of values assigned to forecast parameters which were not collected by data collector 101. For example, in one embodiment of sensitivity analysis the data collector may omit collecting data on the forecasted risk free rate and the analyzer 112 calculates current equity value for a plurality of possible forecasted risk free rate values. In another embodiment of sensitivity analysis the data collector may omit collecting data on the forecasted enterprise growth rate and the analyzer 112 calculates payoffs and current equity value for a plurality of possible forecasted enterprise growth rates.

In the first embodiment the evaluator is used as a tool helping parties to the term sheet agreement understand and negotiate the provisions of the VC term sheet. In an alternative embodiment the investment agreement evaluator 100 is used as a tool helping parties understand and negotiate the provisions of angel investment agreement.

Accordingly, the scope should be determined not by the embodiments illustrated, but by the appended claims and their legal equivalents.

I claim:

1. A method for using an investment agreement evaluator for evaluating an impact of provisions of a venture capital term sheet enterprise investment agreement on a current market value of equity holder equity and on equity holder payoffs, the method steps comprising:

processing, by a computer, collected data regarding one or more provisions in the investment agreement, providing a storage device for storing the collected data on a storage medium, providing an input device which a user can use to store data in said storage medium, providing on a display the collected data which is operatively connected to said storage device for displaying data to said user, utilizing derivatives valuation methods to estimate said current market value of said equity holder equity based on said provisions of said venture capital term sheet enterprise investment agreement, a forecast of the future total enterprise valuation and a market forecast, analyzing, by the computer, an estimation of the impact of said provisions of said venture capital term sheet enterprise investment agreement on said equity holder payoffs for a plurality of possible future enterprise valuations, generating reports on said impact of said provisions on said payoffs for said plurality of possible future enterprise valuations, whereby said reports will present said expected payoffs under said provisions specified in said venture capital term sheet enterprise investment agreement, and said user can evaluate the impact of said provisions on the returns to equity holders, including investors and entrepreneurs.

2. The method of claim 1 wherein said reports include at least one of an exit payoff cumulative distribution diagram, an exit payoff probability density diagram and a minimum exit payoff probability diagram.

3. The method of claim 1 wherein said computer utilizes said display to display screens presenting input forms to said user, and utilizes said input to collect the user's inputs specifying said provisions including at least one of a type of investor shares, a valuation, a capitalization, dividend rights, a liquidation preference, conversion rights and anti-dilution provisions.

4. The method of claim 1 further comprising the steps of:
   a. receiving user inputs specifying an enterprise forecast including at least one an estimated annual growth of the enterprise value, an estimated volatility of the annual growth and an investor's expected time to exit the investment in the enterprise,
   b. receiving user inputs specifying a market forecast, including a forecasted default risk free interest rate,
   c. utilizing binomial model methods to determine the probability distribution for said payoffs at exit based on said provisions of said enterprise investment agreement and said enterprise forecast,
   d. generating reports including probability distribution of said equity holders payoffs.

5. The method of claim 1 further comprising the steps of:
   a. receiving user inputs specifying an enterprise forecast including at least one an estimated annual growth of the enterprise value, an estimated volatility of the annual growth and an investor's expected time to exit the investment in the enterprise,
   b. receiving user inputs specifying a market forecast including a forecasted default risk free interest rate,
   c. utilizing derivatives valuation methods to estimate the current market value of the shareholders equity based on
      a) said provisions of said enterprise investment agreement,
      b) said enterprise forecast,
      c) said market forecast,
   d. generating reports including the estimate of the current market value of equity held by shareholders in the enterprise.

6. The method of claim 1 wherein the inputs are received across a network.

7. The method of claim 1 wherein said generated reports include an absolute exit payoff diagram or a percentage exit payoff diagram whereby said exit diagram will describe plurality of possible future enterprise valuations and the payoffs to shareholders corresponding to said enterprise valuations under said provisions specified in said agreement and said user can evaluate the impact of said provisions on said payoffs.

8. An investment agreement evaluator apparatus for evaluating an impact of provisions of an enterprise investment agreement on equity holders payoffs comprising:
   a. a computer central processing unit for processing data,
   b. a computer storage device for storing data on a non-transitory storage medium,
   c. a user interface device which a user can use to store data in said storage,
   d. a video display terminal which is operatively connected to said computer storage device for displaying data to said user,
   e. a data collector component for collecting information on a plurality of provisions included in said enterprise investment agreement wherein said data collector component is stored in said computer storage,
   f. an analyzer component for estimating the impact of said provisions in said enterprise investment agreement on payoffs to said equity holders wherein said analyzer component is stored in said computer storage and wherein said analyzer determines the probability distribution for said payoffs at an investor's expected time to exit the investment in the enterprise,
   g. a report generator component for generating reports on said impact of said provisions on said payoffs wherein said report generator component is stored in said computer storage and wherein said reports include at least one of an exit payoff cumulative distribution diagram or an exit payoff probability density diagram or a minimum exit payoff probability diagram,
whereby said reports will present said payoffs to said equity holders under said provisions specified in said investment agreement, and said user can evaluate the impact of said provisions on investment returns to said equity holders, including investors and entrepreneurs, for plurality of possible future enterprise valuations.

9. The investment agreement evaluator apparatus of claim 8 wherein said investment agreement is a venture capital term sheet.

10. The investment agreement evaluator apparatus of claim 8 wherein said investment agreement is a binding venture capital investment agreement.

11. The investment agreement evaluator apparatus of claim 8 wherein said data collector utilizes said display to display screens presenting input forms to said user, and utilizes said input to collect the user's inputs specifying said provisions including at least one of a type of investor shares, a valuation, a capitalization, dividend rights, a liquidation preference, conversion rights and anti-dilution provisions.

12. The investment agreement evaluator apparatus of claim 8 wherein said data collector utilizes said display to display screens presenting input forms to said user, and utilizes said input to collect the user's inputs regarding equity held by pre-existing investors, who participated in investment rounds preceding the round governed by said agreement, including at least one of a type of investor shares, dividend rights, a liquidation preference, conversion rights, anti-dilution provisions and a preferred stock's conversion price.

13. The investment agreement evaluator apparatus of claim 8 wherein said data collector utilizes said display to display screens presenting input forms to said user, and utilizes said input to collect the user's inputs specifying enterprise forecast including at least one of an estimated annual growth of the enterprise value, an estimated volatility of the annual growth and an investor's expected time to exit the investment in the enterprise.

14. The investment agreement evaluator apparatus of claim 8 wherein said data collector utilizes said display to display screens presenting input forms to said user, and utilizes said input to collect the user's inputs specifying market forecast including a forecasted default risk free interest rate.

15. The investment agreement evaluator apparatus of claim 8 wherein said input and said display are performed on a client machine running a standard web browser.

16. The investment agreement evaluator apparatus of claim 8 wherein said analyzer utilizes a binary tree to determine the probability distribution for said payoffs at investor's exit based on said provisions of said enterprise investment agreement and the enterprise forecast including an estimated annual growth of the enterprise value, an estimated volatility of the annual growth and an investor's expected time to exit the investment in the enterprise.

17. The investment agreement evaluator apparatus of claim 8 wherein said analyzer utilizes derivatives valuation methods to estimate the current market value of the shareholders equity based on
   a. said provisions of said enterprise investment agreement,
   b. the market forecast, including a forecasted default risk free interest rate,
   c. the enterprise forecast including an estimated annual growth of the enterprise value, an estimated volatility of the annual growth and an investor's expected time to exit the investment in the enterprise.

18. The investment agreement evaluator apparatus of claim 8 wherein said report generator generates reports including at least one of an absolute exit payoff diagram and a percentage exit payoff diagram.

19. The investment agreement evaluator apparatus of claim 8 wherein said report generator generates reports including at least one of an exit payoff cumulative distribution diagram, an exit payoff probability density diagram and a minimum exit payoff probability diagram.

20. The investment agreement evaluator apparatus of claim 8 wherein said report generator generates reports including the estimate of the current market value of equity held by shareholders in the enterprise, wherein the said estimate is calculated utilizing derivatives valuation methods.

* * * * *